(12) United States Patent
Bishara et al.

(10) Patent No.: US 7,778,257 B1
(45) Date of Patent: Aug. 17, 2010

(54) VIRTUAL ETHERNET STACK

(75) Inventors: Nafea Bishara, San Jose, CA (US); Awais B. Nemat, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 138 days.

(21) Appl. No.: 12/044,843

(22) Filed: Mar. 7, 2008

Related U.S. Application Data

(60) Provisional application No. 60/893,473, filed on Mar. 7, 2007.

(51) Int. Cl.
*H04L 12/28* (2006.01)
(52) U.S. Cl. ...................................... 370/400
(58) Field of Classification Search ............... None
See application file for complete search history.

(56) References Cited

U.S. PATENT DOCUMENTS

| | | | |
|---|---|---|---|
| 7,545,735 B1 * | 6/2009 | Shabtay et al. | 370/217 |
| 2004/0184401 A1 * | 9/2004 | Nguyen et al. | 370/216 |
| 2009/0092043 A1 * | 4/2009 | Lapuh et al. | 370/228 |

\* cited by examiner

*Primary Examiner*—Chirag G Shah
*Assistant Examiner*—Otis L Thompson, Jr.

(57) ABSTRACT

The present disclosure includes systems and techniques relating to virtual Ethernet switches. In some implementations, a system includes two or more Ethernet switches. Two or more components are included in the system to open at least one tunnel, over a network, between the two or more Ethernet switches to connect the two or more Ethernet switches together. In addition, two or more components are included in the system to operate a protocol over the opened at least one tunnel to manage the two or more Ethernet switches as a single unit that shares at least one network feature among all of the two or more Ethernet switches.

18 Claims, 5 Drawing Sheets

VIRTUAL ETHERNET STACK

CROSS REFERENCE TO RELATED APPLICATIONS

This application claims the benefit of the priority of U.S. Provisional Application Ser. No. 60/893,473, filed Mar. 7, 2007 and entitled "Virtual Ethernet Stack".

BACKGROUND

The present disclosure describes systems and techniques relating to Ethernet switches.

Ethernet switches can be connected together, using direct physical connections to create a "stack." A stack of Ethernet switches often can share one or more features across the individual switches. For example, a stack can support a single internet protocol (IP) address for all Ethernet switches in the stack. Another example is link aggregation.

SUMMARY

The present disclosure includes systems and techniques relating to a virtual Ethernet stack. According to an aspect of the described systems and techniques, a system for generating a virtual Ethernet stack includes two or more Ethernet switches. The system includes two or more components to open at least one tunnel, over a network, between the two or more Ethernet switches to connect the two or more Ethernet switches together. In addition, the system includes two or more components to operate a protocol over the opened at least one tunnel to manage the two or more Ethernet switches as a single unit that shares at least one network feature among all of the two or more Ethernet switches.

Implementations can optionally include one or more of the following features. The two or more Ethernet switches can be remotely located from one another. The two or more components to operate the protocol can be used to operate the two or more Ethernet switches as a single unit that shares at least one network feature that includes an internet protocol (IP) address. Also, the two or more components to open the at least one tunnel between the two or more Ethernet switches can be designed to connect the two or more Ethernet switches together in a network topology including a ring, a chain, or a star. Further, the two or more components to operate the protocol can be designed to operate the protocol based on a distributed switching architecture.

According to another aspect of the described systems and techniques, a method includes detecting two or more Ethernet switches available to form a single unit. At least one tunnel is opened, over a network, between the detected two or more Ethernet switches to connect the detected two or more Ethernet switches together. Also, a protocol is operated over the opened at least one tunnel to manage the two or more Ethernet switches as a single unit that shares at least one network feature among all of the two or more Ethernet.

Implementations can optionally include one or more of the following features. Two or more remotely located Ethernet switches can be detected. Also, the protocol can be operated to manage the two or more Ethernet switches as a single unit that shares at least one network feature including an internet protocol (IP) address. Opening the at least one tunnel can include connecting the two or more Ethernet switches together in a network topology including a ring, chain, or a star. Further, operating the protocol can include operating a distributed switching architecture.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

Thus, according to another aspect of the described systems and techniques, a system can include two or more data packet forwarding means for forwarding data packets to respective destinations. The system includes at least one connection means for opening a tunnel between the two or more data packet forwarding means to connect the two or more data packet forwarding means together. Also, the system includes a protocol means operating over the at least one connection means to manage the two or more data packet forwarding means as a single unit that shares at least one network feature among all of the two or more data packet forwarding means.

Implementations can optionally include one or more of the following features. The two or more data packet forwarding means can include two or more Ethernet switches. In addition, the two or more data packet forwarding means can be remotely located from one another. The at least one connection means can be used to operate the two or more data packet forward means as a single unit that shares at least one network feature comprising an internet protocol (IP) address. The at least one connection means can be designed to connect the two or more data packet forwarding means together in a network topology including a ring, a chain, or a star.

The described systems and techniques potentially can result in various advantages. For example, two or more Ethernet switches that cannot be directly connected can be managed as a single unit. In addition, a virtual Ethernet stack can be generated to overlay various switches over any topology. Further, a virtual Ethernet stack can be implemented to operate as a single unit using a distributed switching architecture.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

The systems and techniques described herein can be implemented to manage various Ethernet switches as a single unit. The managed various Ethernet switches can be connected together using direct and/or virtual connections to form a virtual Ethernet stack.

Figure 1A:
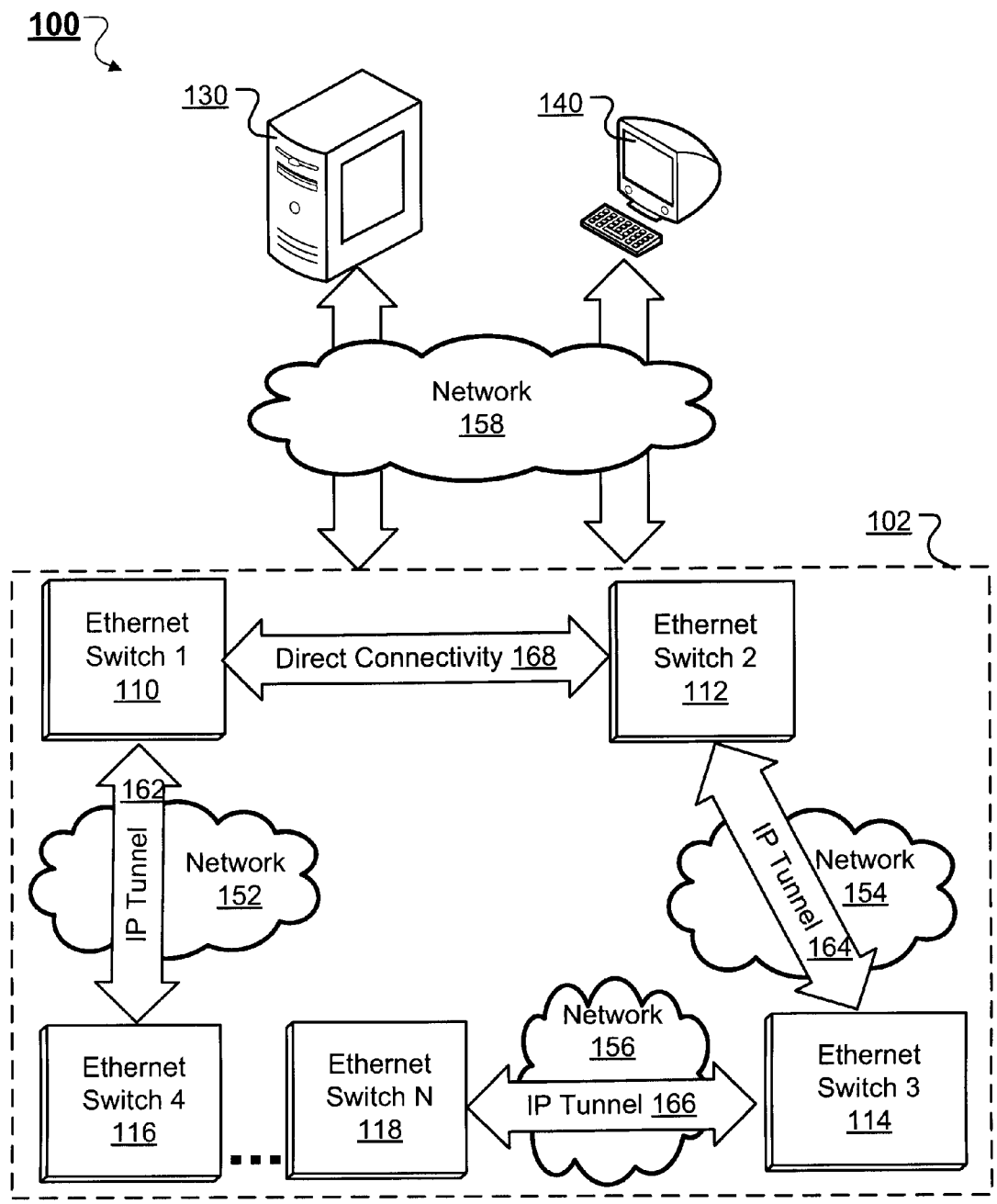
FIG. 1A is a block diagram showing an example system for generating a virtual Ethernet stack.

FIG. 1A is a block diagram showing an example system 100 for generating a virtual Ethernet stack. The system 100 includes multiple Ethernet switches 110, 112, 114, 116, 118 connected together to generate a virtual Ethernet stack 102. The virtual Ethernet stack 102 can group two or more of the Ethernet switches 110, 112, 114, 116, 118 to manage or operate the Ethernet switches as a single unit and share features across the Ethernet switches. For example, a single IP address can be assigned to the entire virtual Ethernet stack 102. Operating as a single unit, the virtual Ethernet stack 102 can be connected to one or more computing systems 130, 140 over a network 158 to receive and route data packets.

The Ethernet switches 110, 112, 114, 116, 118 can inspect data packets received from various sources, such as the computing systems 130, 140. In one implementation, the Ethernet switches 110, 112, 114, 116, 118 can determine the sources and destinations for the received data packets and/or messages and forward the received data packets and/or messages to appropriate destinations. By delivering each data packet only to the intended destination, an Ethernet switch can conserve network bandwidth and offer generally better performance than a network hub.

Traditionally, Ethernet stacks require direct physical connectivity among Ethernet switches to manage the Ethernet switches as a single unit. Thus, conventional Ethernet stacks are limited or dependent on the locations of the individual Ethernet switches.

In contrast, the virtual Ethernet stack 102 is independent of the locations of the individual Ethernet switches 110, 112, 114, 116, 118. The virtual Ethernet stack 102 can include the multiple Ethernet switches 110, 112, 114, 116, 118 located at various locations. For example, Ethernet switches 110 and 112 represent locally located Ethernet switches that are connected together using direct connectivity 168. The direct connectivity 168 represents a connection between the two Ethernet switches 110 and 112 without any intervening devices in-between. The direct connectivity 168 can include a physical wired connection, for example.

In addition, the virtual Ethernet stack 102 can include various Ethernet switches that are located at remote locations from one another. For example, the Ethernet switch 116 can be connected to the Ethernet switch 110 over a network 152. Because the Ethernet switches 116 and 110 are not local to each other, direct connectivity cannot be applied to connect the Ethernet switches 116 and 110 together. Thus, in one implementation, a tunnel 162 (e.g., an IP tunnel) is opened between the remotely located Ethernet switches 110 and 116. Data packets or messages can be transmitted between the connected Ethernet switches 110 and 116 over the open tunnel 162.

In some implementations, the virtual Ethernet stack 102 includes additional remotely located Ethernet switches. For example, remotely located Ethernet switches 112 and 114 can be connected together using a tunnel 164 over a network 154. In addition, the Ethernet switch 114 can be connected to yet another remotely located Ethernet switch 118 using a tunnel 166 over a network 156.

The networks 152, 154, 156, 158 can include a dedicated network such as a local area network (LAN) and a wide area network (WAN). Alternatively, the networks 152, 154, 156, 158 can include an open network such as the Internet. Connections to the networks 152, 154, 156, 158 can be enabled using a wired or wireless communication link. The wired connection can include Universal Serial Bus (USB), firewire, serial, parallel, etc. The wireless connection can include Bluetooth, Wifi, WiMax, infrared, etc. The networks 152, 154, 156, 158 can represent different networks or the same network. For example, the networks 152, 154, 156, 158 can represent the same enterprise network.

Figure 1B:
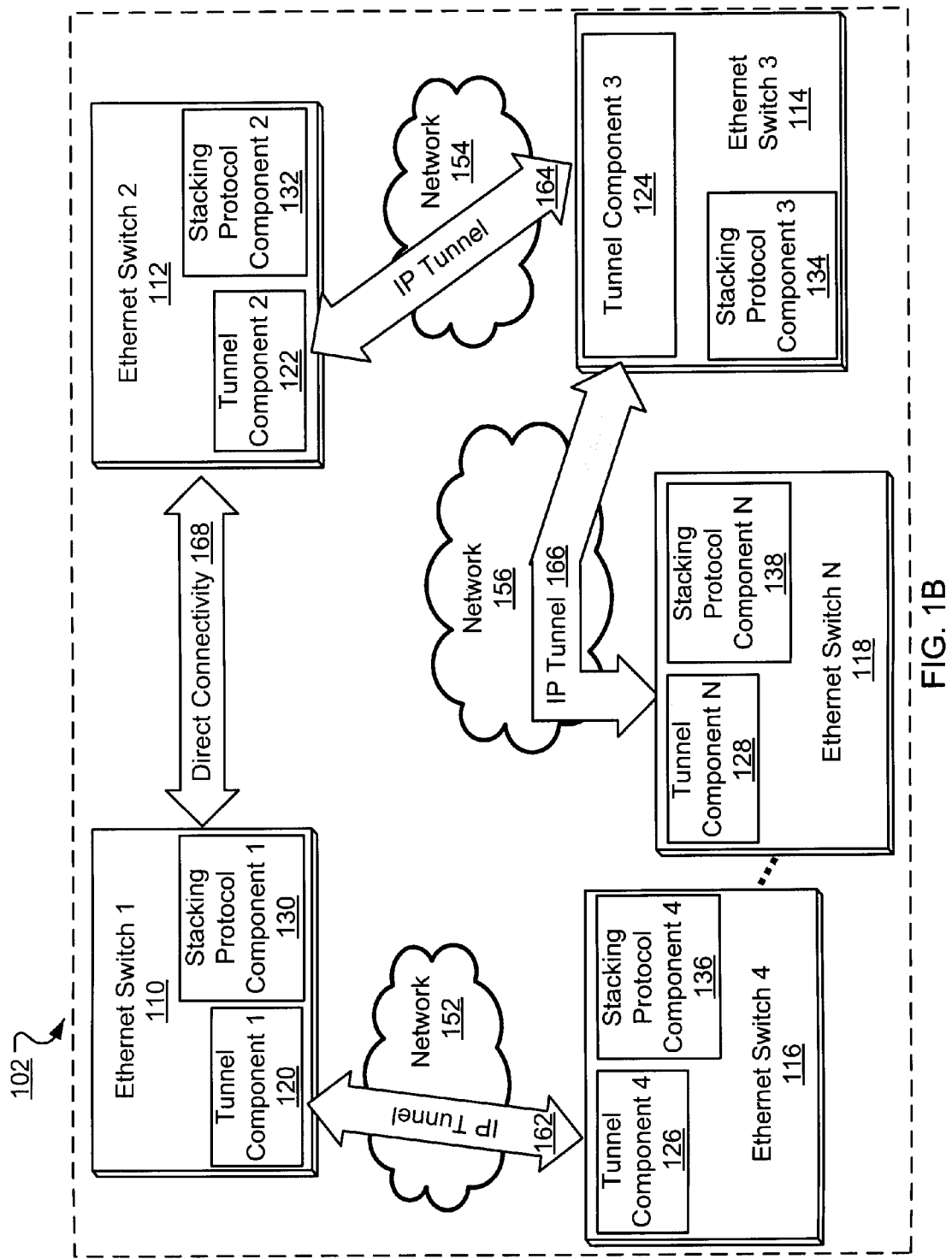
FIG. 1B is a block diagram showing an example Ethernet stack with components to open tunnels and operate protocols.

FIG. 1B is a block diagram showing an example Ethernet stack 102 with components to open tunnels and operate protocols. The Ethernet stack 102 can include components 120, 122, 124, 126, 128 to open IP tunnels among the different Ethernet switches 110, 112, 114, 116, 118 included in the Ethernet stack 102. In addition, the Ethernet stack 102 can include components 130, 132, 134, 136, 138 to operate a protocol to manage all of the connected Ethernet switches together as a single stack unit.

For example, the tunnel component 1 120 and the tunnel component 4 126 can open the IP tunnel 162 between Ethernet switch 1 110 and Ethernet switch 4 116. The tunnel component 2 122 and the tunnel component 3 124 can open the IP tunnel 164 between Ethernet switch 2 112 and Ethernet switch 3 114. The tunnel component N 128 and the tunnel component 3 124 can open the IP tunnel 166 between Ethernet switch N 118 and Ethernet switch 4 114.

The tunnel components 120, 122, 124, 126, 128 and the stacking protocol components 130, 132, 134, 136, 138 can be integrated into the Ethernet switches 110, 112, 114, 116, 118. These components can be implemented using circuitry, or a program embodied on a medium, or a combination of these.

In opening the IP tunnels 162, 164, 166, various tunneling protocols can be implemented. Tunneling protocols, in the internet protocol domain, represent techniques to carry arbitrary information called a passenger packet with an additional IP header called the tunnel header. Also, tunneling protocols can define two end-points that may not be physically connected together. Further, tunneling protocols can encapsulate a payload and carry the payload over an incompatible delivery network. In addition, tunneling protocols can provide a secure path through an untrusted or unsecured network.

Generic Routing Encapsulation (GRE) is an example tunneling protocol designed to encapsulate a wide variety of network layer packets inside IP tunneling packets. The original packet is the payload for the final packet. The GRE protocol can be used on the Internet to secure virtual private networks, VPNs.

GRE is designed to be stateless, and the tunnel end-points are not required to monitor the state or availability of other tunnel end-points. In addition, GRE can create a virtual point-to-point link with routers at remote points.

GRE can be operated over IP protocol number 47. For example, GRE can carry IP packets with RFC 1918 private addresses over the Internet using delivery packets with public IP addresses. In this case, the delivery and payload protocols are compatible, but the payload addresses are incompatible with those of the delivery network.

Once the IP tunnels 162, 164, 166 are opened, the multiple Ethernet switches 110, 112, 114, 116, 118 are virtually connected to form the virtual Ethernet stack 102. In operation, a stacking protocol is used to manage the multiple directly-connected and/or tunneled Ethernet switches 110, 112, 114, 116, 118 as a single virtual Ethernet stack 102. An example stacking protocol includes the distributed switching architecture (DSA).

In the virtual Ethernet stack 102, proprietary messages or data packets are passed between network switches in the stack to support cross-device feature sharing. Each proprietary message can be a self-contained message or piggy backed onto normal data packets flowing between Ethernet switches 110, 112, 114, 116, 118 (e.g., in a DSA tag).

DSA technology represents scalable and reliable networking solutions that can function as the foundation for commonly distributed cascade and stacking switching/routing topologies. DSA technology can provide robust solutions without any feature degradation for both the wiring closet and enterprise backbone markets.

DSA enables networks to be reconfigured without rebooting individual Ethernet switches. In addition, DSA enables the Ethernet switches to be interconnected with high-speed links to act as a single, larger switch.

DSA can enable different types of devices to be integrated into the same unit or stack, which provides features such as high port density and cost optimization. In addition, DSA enabled stacks can be connected in various topologies including a ring, a chain, a star and other chassis based configurations. This feature enables efficient expansion and optimization of networks by quickly and easily adding Ethernet switches to existing stacks without network disruption.

DSA enabled stacks enable intelligent applications to reside at the edge of the network by simply adding additional Ethernet switches to the stack to increase port capability and processing power. This can enable applications such as security, Quality of Service (QoS), Voice over IP, Video over IP, etc.

In addition, DSA can intelligently and quickly discover the correct network topology, automatically configure master slave units within the network, seamlessly enable all features across multiple network devices, and in case of system failure, quickly reconfigure the entire system. Users can easily manage multiple Ethernet switches as a single entity stack without any feature loss. Further, DSA can enable classification features including link aggregation, VLANs, QoS, mirroring etc. across a stack, a cascade or distributed switches.

Figure 1C:
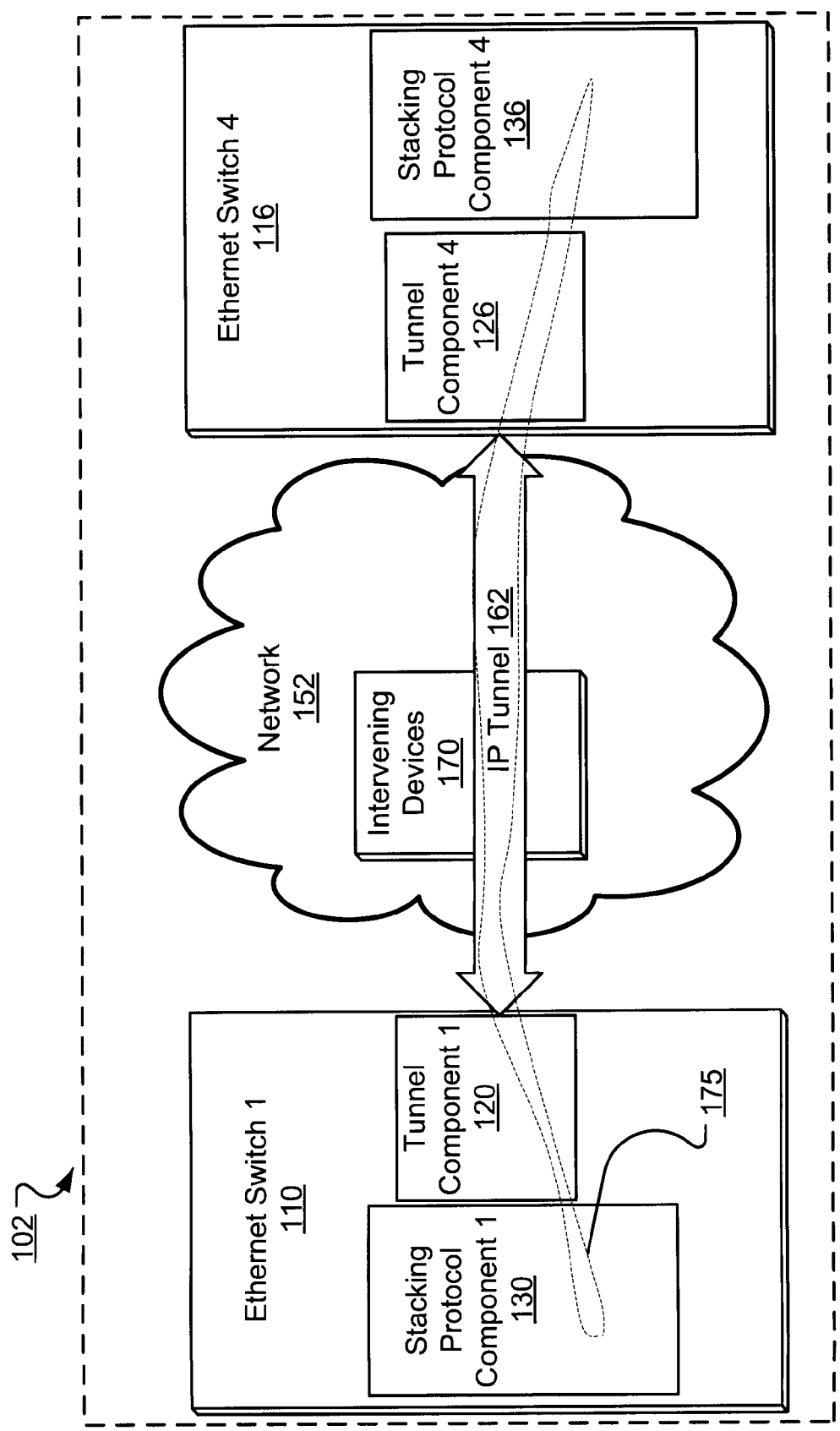
FIG. 1C is a block diagram showing an example tunnel opened between two Ethernet switches.

FIG. 1C is a block diagram showing an example tunnel 162 (e.g., an IP tunnel) opened between two Ethernet switches. For example, the tunnel components 120,126 can open the tunnel 162 between the Ethernet switch 1 110 and Ethernet switch 4 116 even in the presence of one or more intervening or intermediate devices 170. This is possible because tunneling does not require a direct connection. Thus, tunneling enables multiple Ethernet switches that are located far part from one another to be connected together to form an Ethernet stack 102.

Also, the stacking protocol component 1 130 and the stacking protocol component 4 136 can operate a protocol based on a DSA 175 to manage the Ethernet switches 110 and 116 together as a single stack unit 102. The stack 102 can include additional Ethernet switches 112, 114, etc. as described with respect to FIGS. 1A and 1B.

Figure 2:
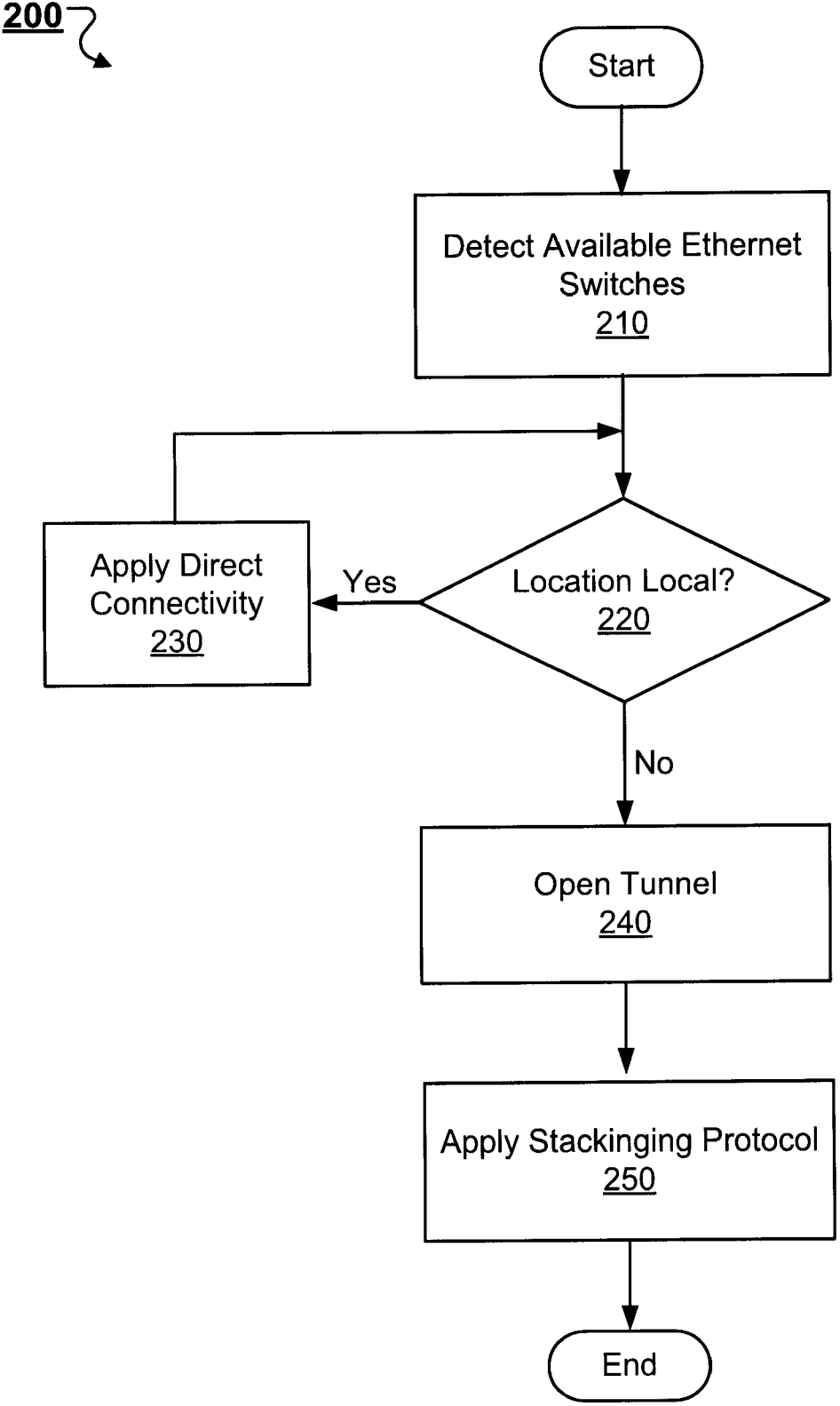
FIG. 2 is a flowchart showing an example process for generating a virtual Ethernet stack.

FIG. 2 is a flowchart showing an example process 200 for generating a virtual Ethernet stack 102. Ethernet switches available for staking are detected or identified 210 regardless of the locations of the Ethernet switches. In addition, locations and connectivity of the detected Ethernet switches are detected or identified 220. Those Ethernet switches that are located near each other are connected 230 together using direct connectivity, if not already connected. Those Ethernet switches that are remotely located from each other are virtually connected by opening 240 tunnels. Direct and/or virtual (e.g., by tunneling) connections are made to link the available Ethernet switches in various topologies including a ring, a chain, a star, etc. To operate the connected Ethernet switches as a unified stack, a stacking protocol, such as DSA is applied 250.

Figure 3:
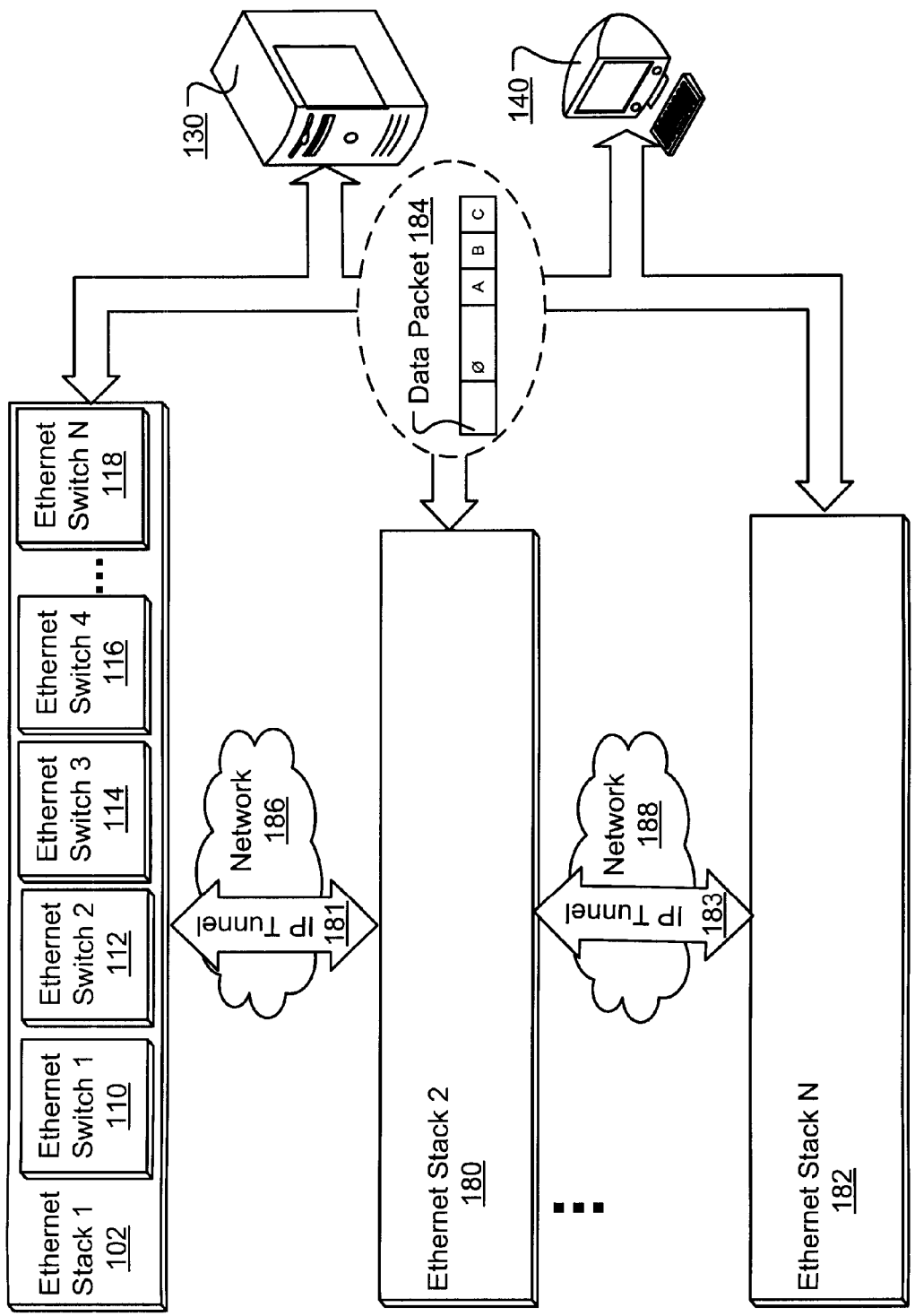
FIG. 3 shows an example implementation of the described systems and techniques.

FIG. 3 shows an example implementation of the described systems and techniques. Multiple Ethernet stacks 102, 180, 182 can be connected over one or more networks 186, 188 to manage transmission of data packets 184 to and from one or more computing systems 130, 140. The Ethernet stacks 102, 180, 182 can be connected together by opening tunnels 181, 183 among the Ethernet stacks 102, 180, 182. Each Ethernet stack 102, 180, 182 can include multiple Ethernet switches connected together using IP tunnels as described with respect to FIGS. 1A, 1B, and 2. For example, the Ethernet stack 102 can include Ethernet switches 110, 112, 114, 116, 118 tunneled together over one or more networks.

Embodiments of the subject matter described in this specification has been described with respect to Ethernet switches. However, virtual stacks can be generated using other data packet forwarding means, such as other switches and network appliances.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A system comprising:
an enterprise network;
two or more Ethernet switches located in the enterprise network;
two or more components to open at least one tunnel, over the enterprise network, between the two or more Ethernet switches to connect the two or more Ethernet switches together; and
two or more components to operate a protocol over the at least one tunnel to manage the two or more Ethernet switches as a single unit that shares at least one network feature among all of the two or more Ethernet switches;
wherein each of the two or more Ethernet switches are remotely located from one another, and the two or more components to connect the two or more Ethernet switches in a network topology with a given Ethernet switch being connected to at least one other Ethernet switch in the two or more Ethernet switches using the at least one opened tunnel.

2. The system of claim 1, wherein the two or more components to open the at least one tunnel and the two or more components to operate the protocol are respectively integrated with the two or more Ethernet switches.

3. The system of claim 1, wherein the two or more-components to operate the protocol are configured to operate the two or more Ethernet switches as a single unit that shares at least one network feature comprising an internet protocol (IP) address.

4. The system of claim 1, wherein the two or more components to open the at least one tunnels between the two or more Ethernet switches are configured to connect the two or more Ethernet switches together in the network topology comprising a ring, a chain, or a star.

5. The system of claim 1, wherein the two or more components to operate the protocol are configured to operate the protocol based on a distributed switching architecture.

6. A method comprising:
detecting two or more Ethernet switches available to form a single unit;
opening at least one tunnel between the detected two or more Ethernet switches over a network to connect the detected two or more Ethernet switches together; and
operating a protocol over the opened at least one tunnel to manage the detected two or more Ethernet switches as a single unit that shares at least one network feature among all of the detected two or more Ethernet switches;
wherein each of the two or more Ethernet switches are remotely located from one another, and the two or more Ethernet switches are connected in a network topology with a given Ethernet switch being connected to at least one other Ethernet switch in the two or more Ethernet switches using the at least one opened tunnel.

7. The method of claim 6, wherein operating the protocol comprises managing the detected two or more Ethernet switches as a single unit that shares at least one network feature comprising an internet protocol (IP) address.

8. The method of claim 6, wherein opening the at least one tunnel comprises connecting the detected two or more Ethernet switches together in the network topology comprising a ring, a chain, or a star.

9. The method of claim 6, wherein operating the protocol comprises operating a distributed switching architecture.

10. A computer program product, embodied on a non-transitory computer-readable medium, operable to cause a data processing apparatus to perform operations comprising:
detecting two or more Ethernet switches available to form a single unit;
opening at least one tunnel between the detected two or more Ethernet switches over a network to connect the detected two or more Ethernet switches together; and
operating a protocol over the opened at least one tunnel to manage the two or more Ethernet switches as a single unit that shares at least one network feature among all of the two or more Ethernet switches;
wherein each of the two or more Ethernet switches are remotely located from one another, and the two or more Ethernet switches are connected in a network topology with a given Ethernet switch being connected to at least one other Ethernet switch in the two or more Ethernet switches using the at least one opened tunnel.

11. The computer program product of claim 10, further operable to operate the protocol to manage the two or more Ethernet switches as a single unit that shares at least one network feature comprising an internet protocol (IP) address.

12. The computer program product of claim 10, further operable to open the at least one tunnel to connect the two or more Ethernet switches together in the network topology comprising a ring, a chain, or a star.

13. The computer program product of claim 10, further operable to operate the protocol using a distributed switching architecture.

14. An Ethernet switch comprising:
a component, comprising hardware, to open at least one tunnel, over a network, between the Ethernet switch and at least one other Ethernet switch in the network to connect the Ethernet switch and the at least one other Ethernet switch together; and
a component, comprising hardware, to operate a protocol over the at least one tunnel to manage the Ethernet switch and the at least one other Ethernet switch as a single unit that shares at least one network feature among all of the connected Ethernet switches;
wherein the Ethernet switch and the at least one other Ethernet switch are remotely located from one another, and the component to connect the Ethernet switch and the at least one other Ethernet switch in a network topology with the Ethernet switch being connected to the at least one other Ethernet switch using the at least one opened tunnel.

15. The Ethernet switch of claim 14, wherein the component to open the at least one tunnel and the component to operate the protocol are integrated with the Ethernet switch.

16. The Ethernet switch of claim 14, wherein the component to operate the protocol is configured to operate at least the Ethernet switch and the at least one other Ethernet switch as a single unit that shares at least one network feature comprising an internet protocol (IP) address.

17. The Ethernet switch of claim 14, wherein the component to open the at least one tunnel between the Ethernet switch and the at least one other Ethernet switch is configured to connect the Ethernet switch and the at least one other Ethernet switch together in the network topology comprising a ring, a chain, or a star.

18. The Ethernet switch of claim 14, wherein the component to operate the protocol is configured to operate the protocol based on a distributed switching architecture.

* * * * *